United States Patent [19]

Sasaki

[11] Patent Number: 4,467,648

[45] Date of Patent: Aug. 28, 1984

[54] ELEVATOR FOR WATER EXAMINING INSTRUMENT

[75] Inventor: Toshihiko Sasaki, Kobe, Japan

[73] Assignee: Mitsubishi Denki Kabushiki Kaisha, Tokyo, Japan

[21] Appl. No.: 474,666

[22] PCT Filed: Jul. 27, 1982

[86] PCT No.: PCT/JP82/00287

§ 371 Date: Mar. 2, 1983

§ 102(e) Date: Mar. 2, 1983

[30] Foreign Application Priority Data

Nov. 10, 1981 [JP] Japan .................................. 56-180601

[51] Int. Cl.³ ............................................ G01D 21/00
[52] U.S. Cl. ................................ 73/432 R; 73/864.31; 901/14
[58] Field of Search ............ 73/432 R, 432 B, 864.31; 414/8, 735; 901/14

[56] References Cited

U.S. PATENT DOCUMENTS

| 3,313,159 | 4/1967 | Vanderbeck | 73/864.31 |
| 3,922,921 | 12/1975 | Woo | 73/432 R |
| 4,037,476 | 7/1977 | McCrabb | 73/864.31 |
| 4,204,431 | 5/1980 | Schulz | 73/864.31 |
| 4,407,625 | 10/1983 | Shum | 901/14 |

Primary Examiner—S. Clement Swisher
Attorney, Agent, or Firm—Bernard, Rothwell & Brown

[57] ABSTRACT

An elevator particularly suitable for outdoor uses for lifting up and down a water examining instrument, in which a water examining instrument (3) is swingable into a horizontal position from a vertical position or vice versa upon rotating an arm (16) by a handle (12) through a worm (14) and a worm wheel (15), the arm (16) being also turnable in a horizontal plane upon rotating a support column (5) by a handle (18).

2 Claims, 4 Drawing Figures

ELEVATOR FOR WATER EXAMINING INSTRUMENT

TECHNICAL FIELD

This invention relates to an elevator particularly suitable for lifting up and down a water examination instrument to be immersed in a clean-water or sewage treating pool for the inspection of water quality.

BACKGROUND OF THE ART

An example of the conventional apparatus of this sort is shown in FIG. 1, in which indicated at (1) is a treating pool, at (2) water to be examined, at (3) a water examining instrument, and at (4) a base of an elevator mechanism for lifting up and down the water examining instrument (3) and having an upright support column (5) securely erected thereon. An elevator frame (7) which is linked to an elevating handle (6) through a lift mechanism, not shown, is movable up and down along the support column (5) by rotation of the elevating handle (6). Denoted at (8) is an arm which is securely fixed to the lift frame (7) at one end thereof and provided with a bracket (9) at the other end for supporting the water examining instrument (3) therein. The reference numeral (10) indicates a guard rail which is provided for the sake of safety in most cases.

With the conventional elevator mechanism of the above described construction, the elevator frame (7) is lifted up and down by turning the elevating handle (6), moving up and down therewith the water examining instrument (3) by the lift arm (8) and bracket (9) which are securely fixed to the elevator frame (7).

When the level of water to be examined is low, however, it becomes necessary to employ a long water examining instrument which needs to be lifted up and down over a greater distance by the use of a large elevator mechanism with a greater lift, resulting in a costly, instably tall elevator construction. Besides, the maintenance and service of the detector or other parts of the water examining instrument involves considerable labor and dangerous operations, requiring the operator to lean out over the pool or to move the elevator as a whole.

DISCLOSURE OF THE INVENTION

This invention provides an elevator for a water examining instrument, wherein the instrument is supported rotatably about a first axis extending in the longitudinal direction of an arm which supports the instrument and also about a second axis extending in the lifting direction of the elevator, thereby permitting a significant reduction in the lift distance of the elevator and facilitating maintenance and service of the examining instrument in a safe position, in addition to reductions in size, weight and cost of the elevator itself and its stable installation.

BEST MODE FOR CARRYING OUT THE INVENTION

Figure 1:
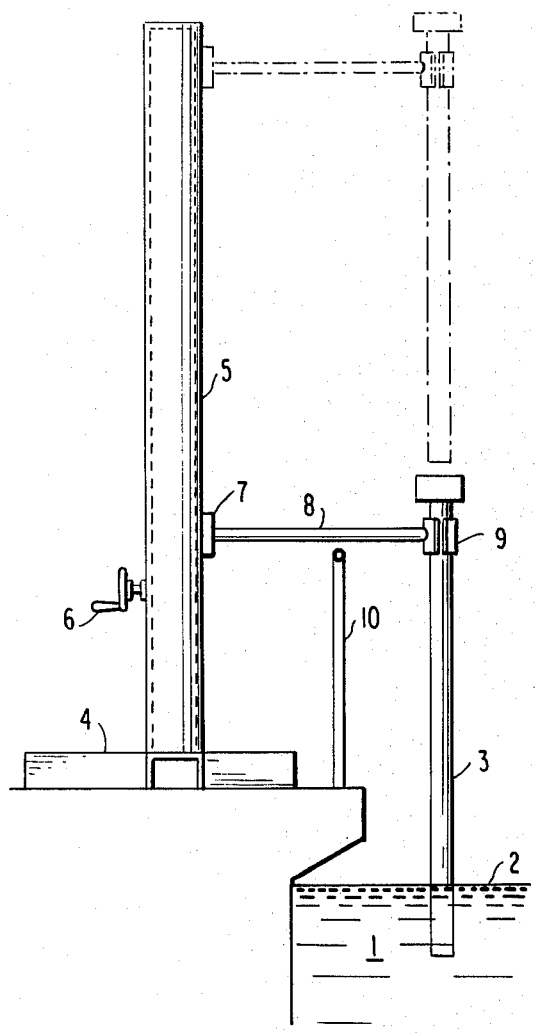
FIG. 1 is a schematic side elevation of a conventional elevator for a water examining instrument.
Figure 4:
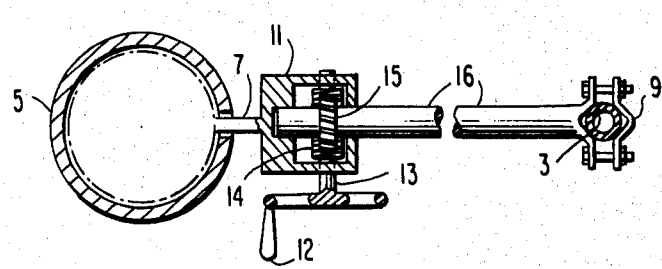
FIG. 4 is a sectional view taken on line IV—IV of FIG. 3.
Figure 3:
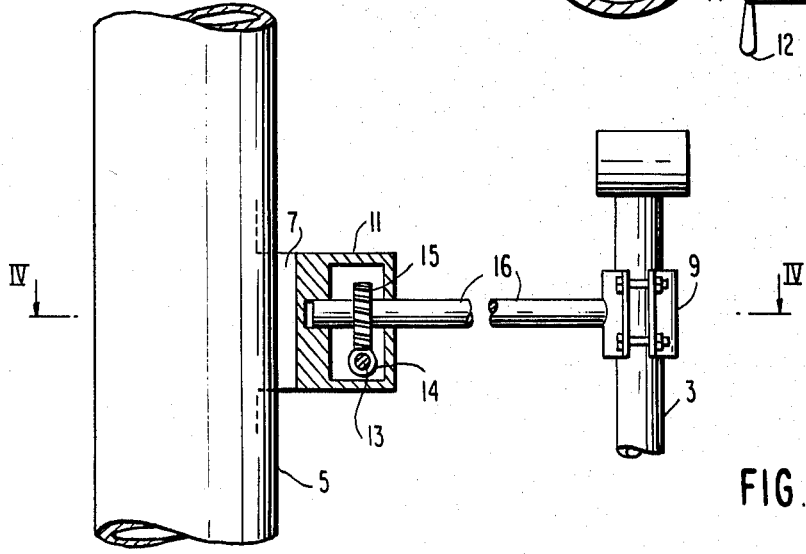
FIG. 3 is an enlarged view of a portion of the elevator of FIG. 2, in the area of the arm 16.
Figure 2:
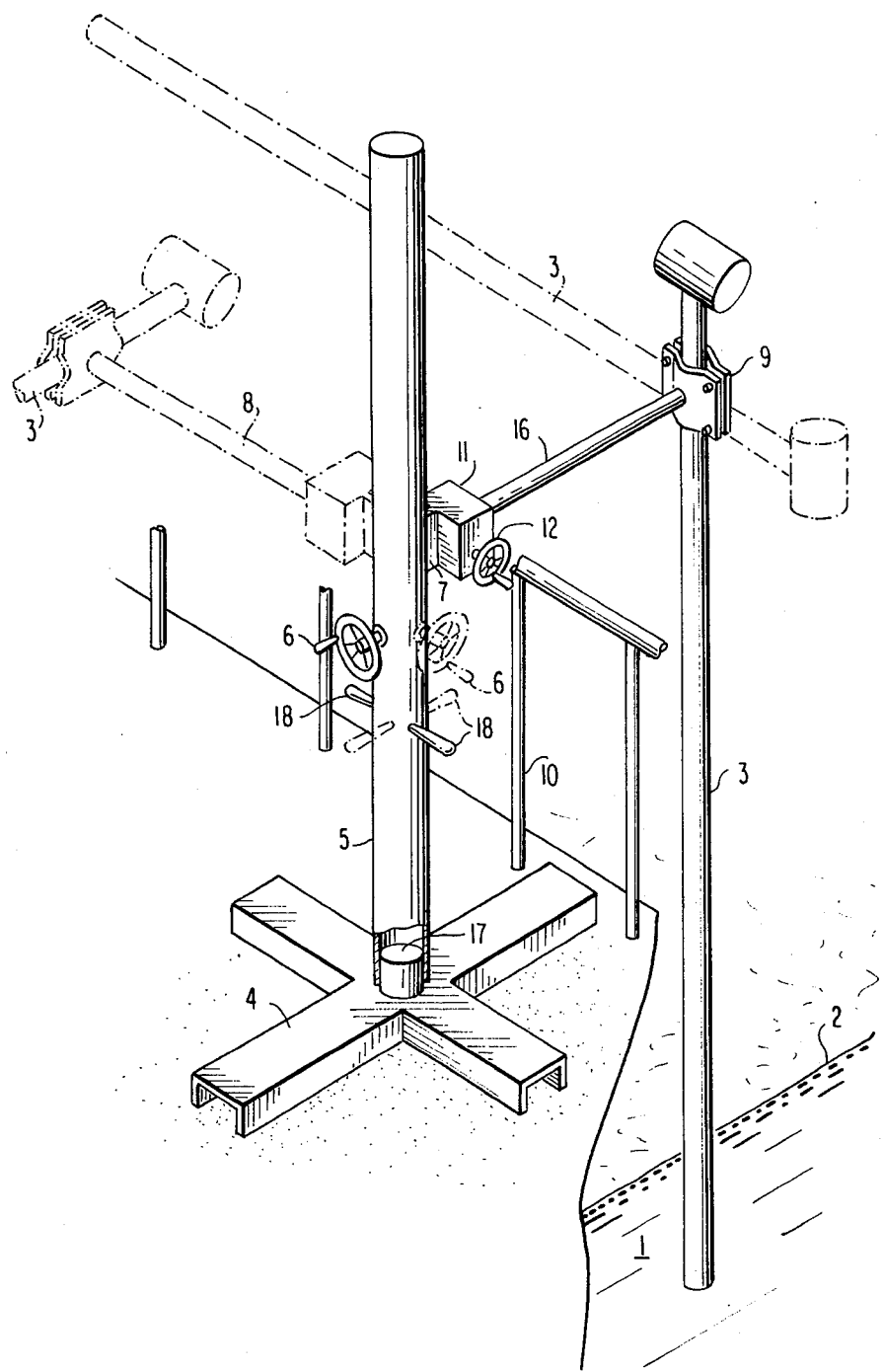
FIG. 2 is a perspective view of an elevator for water examining instrument, embodying the present invention.

Referring to FIGS. 2 to 4, there is illustrated an elevator according to the invention, which is same as the above-described conventional elevator in fundamental arrangement. In these figures, the component parts which are common to FIG. 1 are designated by like reference numerals. In this particular embodiment shown, a gear box (11) is provided on the elevator frame (7), rotatably supporting therein a worm (14) of a worm gear (13) which is integrally connected to a rotating handle (12) and a worm wheel (15) which is meshed with the worm (14). Securely fixed to the worm wheel (15) is an arm (16) which corresponds to the arm (8) of FIG. 1, which arm (16) has mounted thereon a water examining instrument (3) through a bracket (9). The support column (5) is rotatably supported on the base (4) through a bearing (17) and has a handle (18) attached thereto for rotating same. Although not shown, the support column may be provided with a stopper for fixing it at a position or positions of desired rotational angles.

With the above-described elevator construction, the elevator frame (7) can be lifted up and down by means of the elevator handle (6), while the worm (14) can be rotated through the worm shaft (13) upon rotating the handle (12) which is integrally connected to the worm (14), thereby to turn the water examining instrument (3) about a rotational axis extending in the longitudinal direction of the arm (16) through the worm wheel (15) in meshing engagement with the worm (14), arm (16) and bracket (9). As a result, the water examining instrument (3) in a vertical position can be turned into an arbitrary horizontal position, and can also be returned to the vertical position by turning the handle (12) in a reverse direction.

Further, for performing jobs in maintenance and service of the water examining instrument (3) or for mounting or replacing same from the ground side, the water examining instrument (3) is put in the horizontal position and then the support column (5) is rotated by the handle (18) to swivel about a rotational axis extending in the longitudinal direction of the elevator frame (7), releasing the lock of the bearing (17) or overcoming its locking force, thereby setting the water examining instrument in a position which is easily and safely accessible at the time of maintenance and service or on other occasions.

Although the support column (5) which constitutes the main body of the elevator is shown in a mono-cylindrical form in the foregoing description, it may be of any other shape as long as it is capable of the above-described elevating and swivelling operations. Further, the elevator frame (7) which has been shown as being lifted up and down by the handle (6), it may be fixed at an arbitrary position. Moreover, in the particular embodiment shown, the arm (3) which holds the water examining instrument (3) is arranged to be turned by the use of the worm (14) and worm wheel (15), but it is to be understood that there may be employed any other rotating means for the arm (16) or a motor drive may be employed instead of the manual handle (16) to effect the operation as described hereinbefore.

We claim:

1. An elevator for a water examining instrument, including an elevator frame mounted on and movable up and down along an upright support structure and a water examining instrument supported by said elevator frame through an arm, said elevator being characterized in that said water examining instrument is supported rotatably about a first rotational axis extending in the longitudinal direction of said arm and a second rotational axis extending in the direction of movement of said elevator frame.

2. The elevator as set forth in claim 1, wherein said water examining instrument is rotated about said first rotational axis by a mechanism including a worm and a worm wheel.

* * * * *